*Jerome Machlis*
*INVENTOR*

*BY* [signature]
*ATTORNEY*

Jan. 30, 1962 J. MACHLIS 3,019,289

COLOR BAR/DOT GENERATOR

Filed Nov. 5, 1956 10 Sheets-Sheet 2

Jerome Machlis
INVENTOR

BY [signature]

ATTORNEY

Jan. 30, 1962

J. MACHLIS 3,019,289

COLOR BAR/DOT GENERATOR

Filed Nov. 5, 1956

10 Sheets-Sheet 3

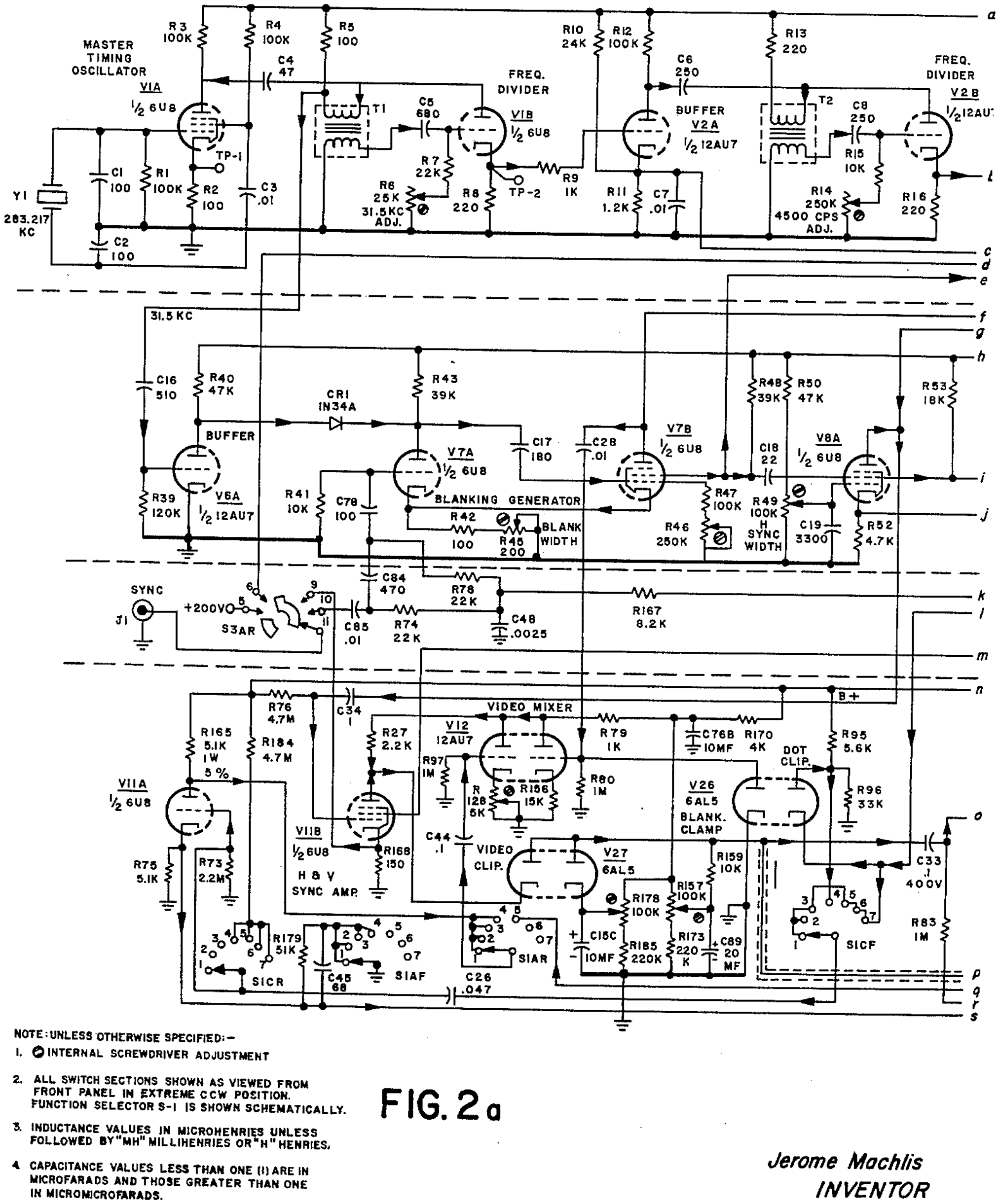

NOTE: UNLESS OTHERWISE SPECIFIED:—

1. ⊘ INTERNAL SCREWDRIVER ADJUSTMENT
2. ALL SWITCH SECTIONS SHOWN AS VIEWED FROM FRONT PANEL IN EXTREME CCW POSITION. FUNCTION SELECTOR S-1 IS SHOWN SCHEMATICALLY.
3. INDUCTANCE VALUES IN MICROHENRIES UNLESS FOLLOWED BY "MH" MILLIHENRIES OR "H" HENRIES.
4. CAPACITANCE VALUES LESS THAN ONE (1) ARE IN MICROFARADS AND THOSE GREATER THAN ONE IN MICROMICROFARADS.
5. RESISTANCE VALUES IN OHMS UNLESS FOLLOWED BY "K" KILOHMS OR "M" MEGOHMS. ALL RESISTORS ARE 1/2 WATT, ±10%
6. DEPENDS ON CHANNEL USED (3 OR 4 A/R).
7. WIRE COLOR, NOT SIGNAL COLOR.

° ARROWHEADS INDICATE DIRECTION OF SIGNAL PATH

FIG. 2a

*Jerome Machlis*
*INVENTOR*

BY [signature]

*ATTORNEY*

Jerome Machlis
INVENTOR

BY [signature]
ATTORNEY

Jan. 30, 1962 J. MACHLIS 3,019,289

COLOR BAR/DOT GENERATOR

Filed Nov. 5, 1956 10 Sheets-Sheet 5

Jerome Machlis
INVENTOR

BY Forest J. Lilley

ATTORNEY

Jerome Machlis
INVENTOR
BY
ATTORNEY

Jan. 30, 1962 J. MACHLIS 3,019,289

COLOR BAR/DOT GENERATOR

Filed Nov. 5, 1956 10 Sheets-Sheet 7

Jerome Machlis
INVENTOR

BY [signature]
ATTORNEY

Jan. 30, 1962 J. MACHLIS 3,019,289
COLOR BAR/DOT GENERATOR
Filed Nov. 5, 1956 10 Sheets-Sheet 8

Jerome Machlis
INVENTOR

BY [signature]
ATTORNEY

MONOCHROME ("Y", SYNC, & BLANKING) COMPONENT

CHROMA (BURST & COLOR) COMPONENT

COMPLETE BAND "A" SIGNAL

*Jerome Machlis*
*INVENTOR*

*BY* [signature]
*ATTORNEY*

Jan. 30, 1962

J. MACHLIS 3,019,289

COLOR BAR/DOT GENERATOR

Filed Nov. 5, 1956

10 Sheets-Sheet 10

*Jerome Machlis*
*INVENTOR*

*BY* [signature]

*ATTORNEY*

United States Patent Office 3,019,289

Patented Jan. 30, 1962

3,019,289

COLOR BAR/DOT GENERATOR

Jerome Machlis, Granada Hills, Calif., assignor, by mesne assignments, to Motec Industries, Inc., Hopkins, Minn., a corporation of Minnesota Filed Nov. 5, 1956, Ser. No. 620,262
15 Claims. (Cl. 178—5.4)

The present invention relates generally to signal generators and more particularly to a color bar/dot generator.

It is an object of this invention to provide a compact color-signal test set capable of supplying precise test signals for the alignment and trouble-shooting of color and monochrome television receiving or transmitting equipment.

Another object of the invention is to provide a completely self-contained signal generator capable of providing a wide variety of output signals.

A further object of this invention is to provide a signal generator capable of generating all necessary components for the simulation of a full color signal transmission.

A still further object of the invention is to provide a signal generator including novel encoding circuits for the production of different color band patterns.

Briefly, the foregoing and other objects are preferably accomplished by providing a signal generator including internal timing circuits, generators for producing synchronizing and blanking pulses, linearity bars and dots in established internally timed relationships, mixing and output circuits for forming composite video output signals, and encoding circuits for establishing color signal components for the video signals.

The signal generator is arranged to present a complete assortment of color TV (Television) test signals which can be selected by operating a function switch, for example. The first position is preferably for production of white horizontal bars, the second for white vertical bars and the third a composite white crosshatch pattern. These signals permit testing and servicing for correct horizontal and vertical linearity. The fourth position provides a white dot pattern for testing or making convergence adjustments.

For either trouble-shooting or alignment of color circuits, the fifth, sixth and seventh positions of the function switch selects three different chroma sequences, bands "A," "B" and "C," providing all the necessary types of color signals. Band "A" contains eight vertical bars, the first bar corresponding to white followed by six NTSC (National Television Systems Committee) colors corresponding in phase and amplitude to yellow, cyan, green, magenta, red and blue respectively, and finally an eighth bar of black. Bands "B" and "C" each contain four vertical bars required in the complete alignment of chroma demodulator circuits. Band "B" is used on receivers demodulating with color difference signals and band "C" is used to align color TV receivers utilizing I and Q type demodulators.

The invention possesses other objects and features, some of which together with the foregoing, will be set forth in the following description of a preferred embodiment of the invention, and the invention will be more fully understood by reading the description with joint reference to the attached drawings, in which:

FIGURES 1*a*, 1*b* and 1*c* form a block diagram of a preferred embodiment of the invention;

FIGURES 2*a*, 2*b*, 2*c* and 2*d* are detail wiring diagrams of the preferred embodiment of the invention;

Figure 1A:
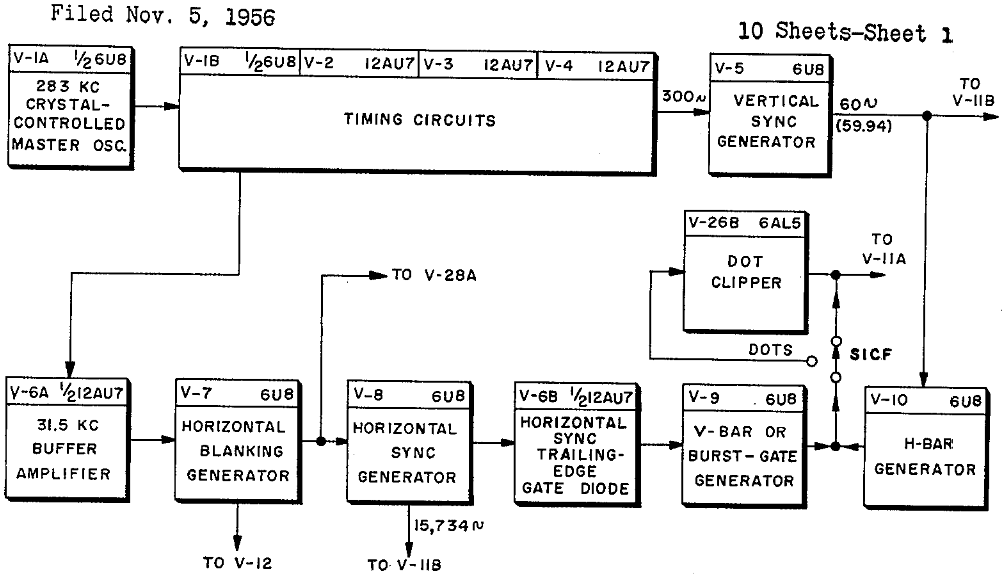
Figure 1B:
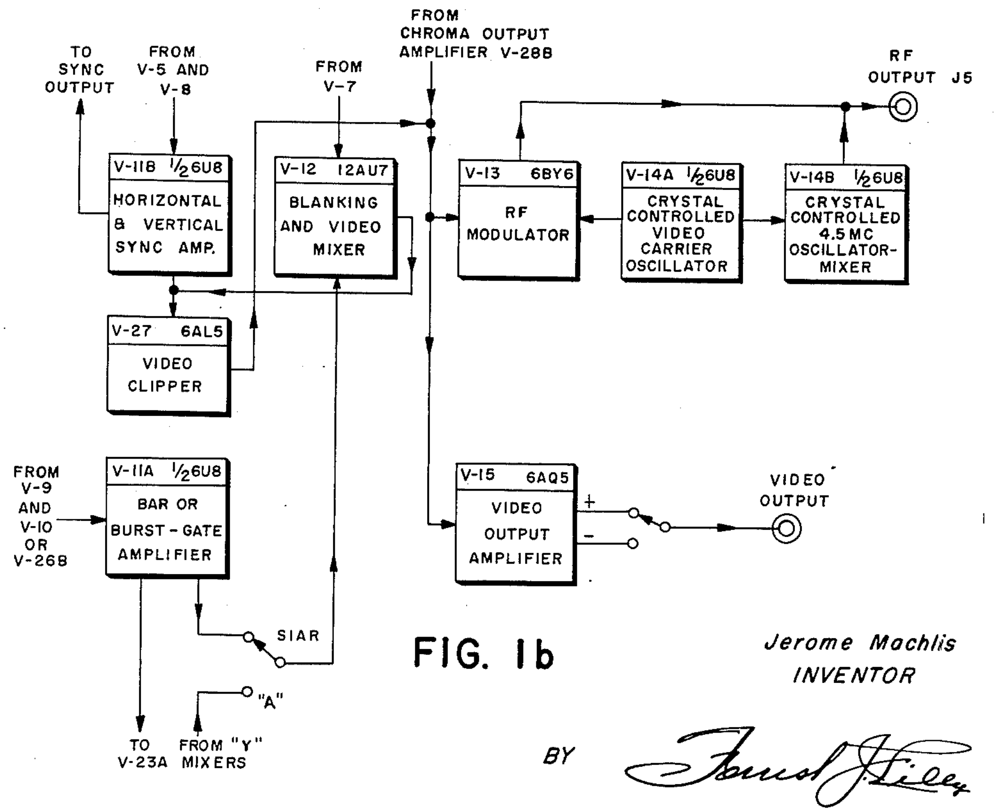
Figure 1C:
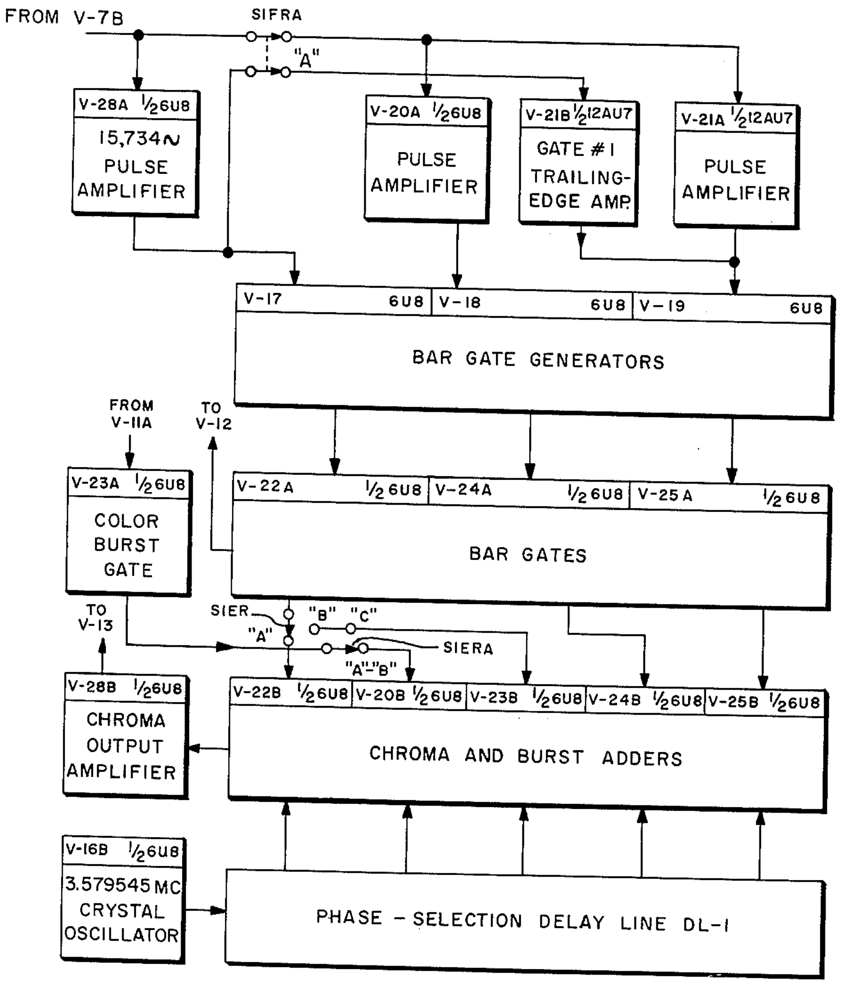
Figure 2B:
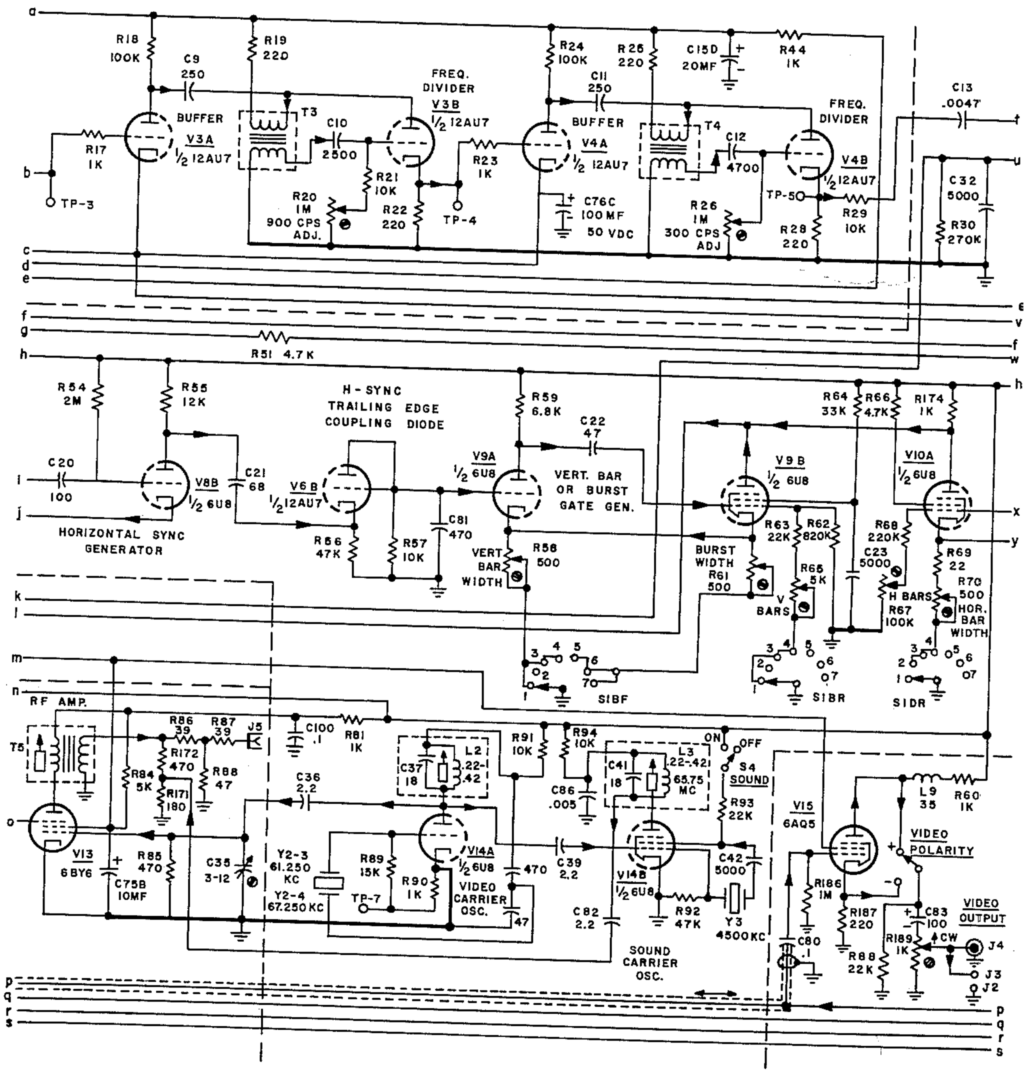
Figure 2C:
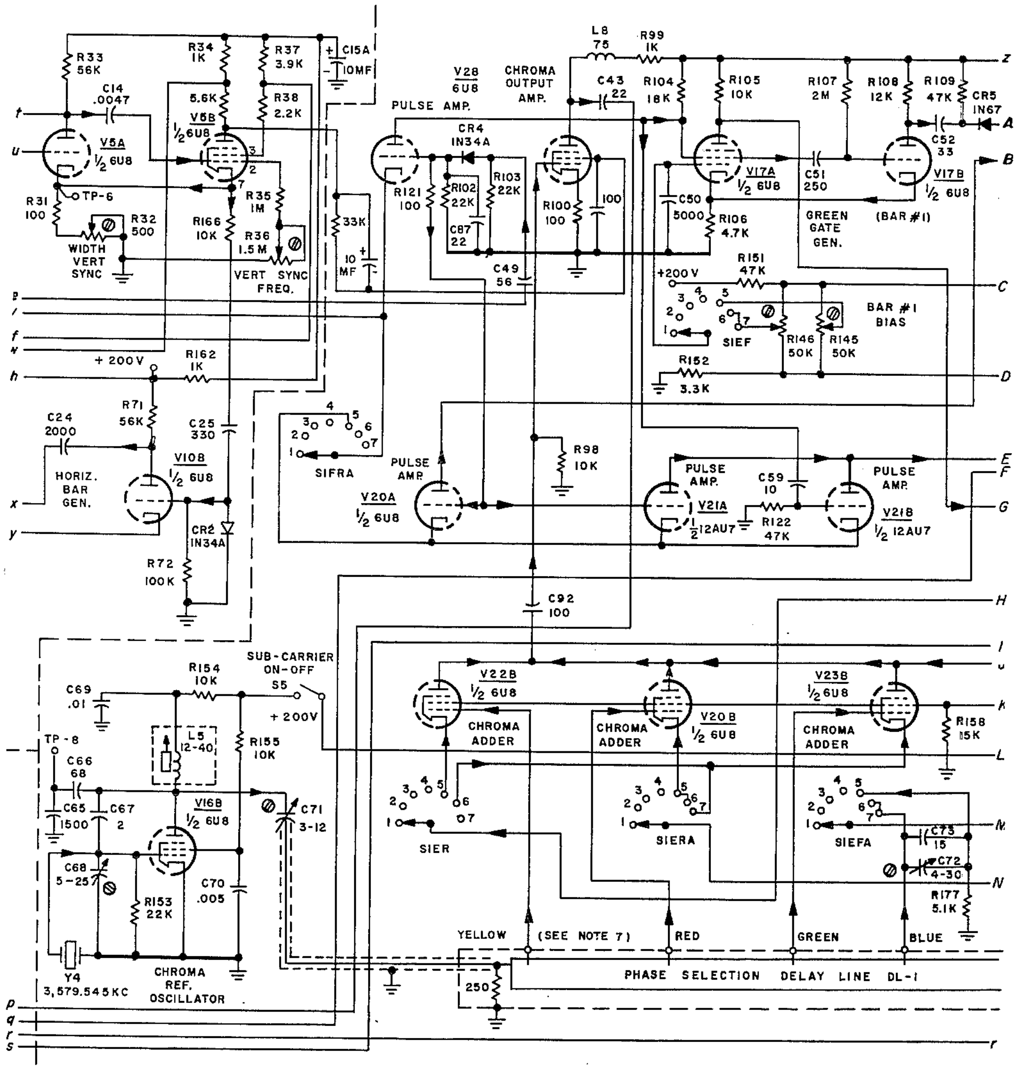
Figure 2D:
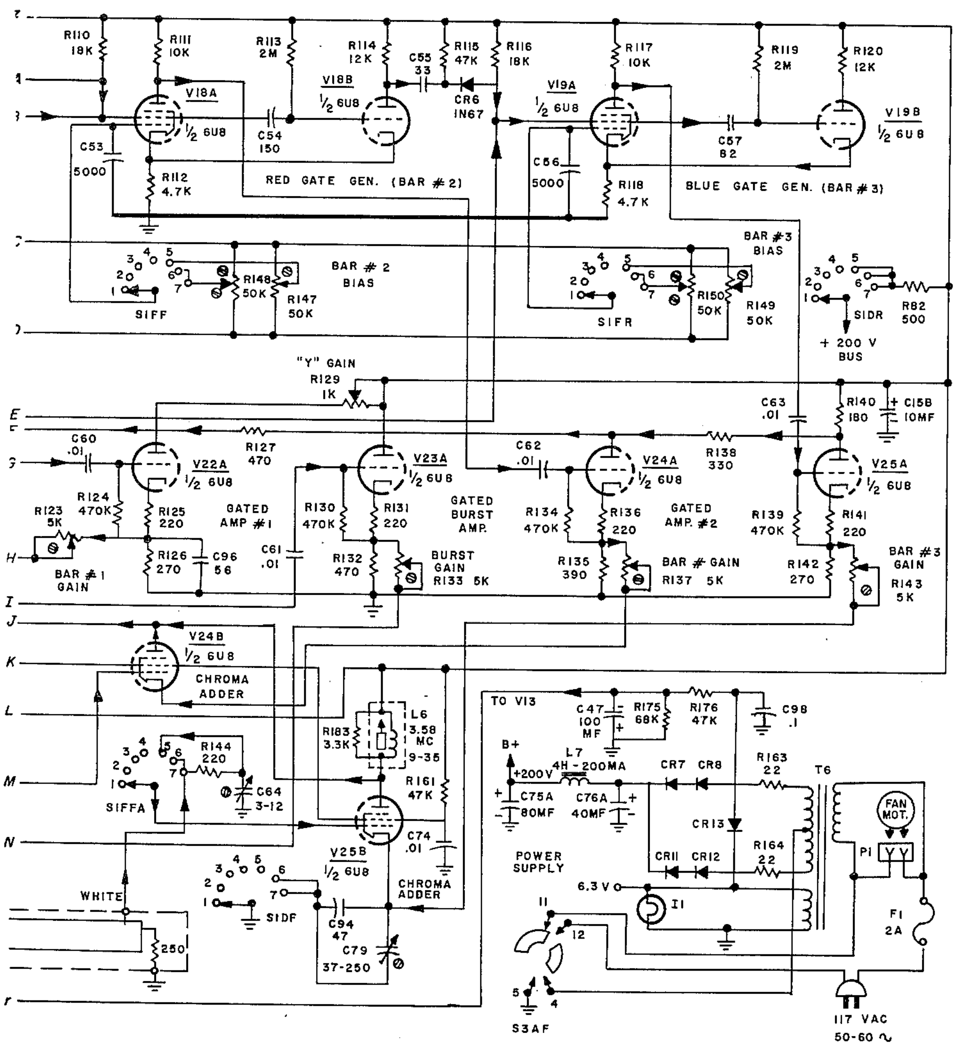

FIGURES 1*a*, 1*b* and 1*c*, together, comprise a block diagram of a preferred embodiment of the present invention. Functionally, FIGURE 1*a* is a block diagram of the timing circuits of the invention and FIGURE 1*b* is a block diagram of the mixing and R.-F. circuits. FIGURE 1*c* is a block diagram of the color bar band circuits. These three figures are interconnected as indicated by the legends placed near the ends of unconnected leads, and comprise a complete block diagram of the invention.

Horizontal and vertical synchronizing signals are both derived from a 283.217 kc. crystal-controlled master oscillator V–1A by frequency division as shown in FIGURE 1*a*. Frequency division is accomplished by timing circuits including V–1B, V–2, V–3 and V–4. The output from V–1B is a 31.5 kc. signal which is fed to buffer amplifier V–6A, and the output from V–4 is a 300 c.p.s. signal fed to vertical synchronizing generator V–5. Vertical synchronizing generator V–5 is a cathode-coupled asymmetrical multivibrator having a natural frequency slightly less than one fifth the frequency from V–4 for proper synchronization. This produces a 60 c.p.s. (actually 59.94) output signal from V–5.

Horizontal blanking pulses 15,734 c.p.s. are generated by horizontal blanking generator V–7 which is triggered by the 31.5 kc. output signal from V–6A. Monostable horizontal synchronizing generator V–8 is triggered by the leading edge of the output pulses of V–7 and generates the horizontal synchronizing signal.

The horizontal synchronizing signal is differentiated and then rectified by horizontal synchronizing trailing-edge gate diode V–6B through which the trailing edge of the horizontal synchronizing signal is passed to time the operation of vertical bar generator V–9. The bar generator V–9 is free-running during the horizontal sweep and the horizontal synchronizing pulse trailing edge is used to synchronize the vertical bar generator V–9 at the beginning of each sweep interval. The vertical bar generator V–9 is operative during vertical bars, crosshatch and dots signal generation, as well as during color bands "A," "B" and "C" generation when V–9 is used as a burst-gate generator.

Horizontal bar generator V–10 operates in a similar manner to V–9 and is synchronized at the beginning of each vertical sweep interval by vertical synchronizing pulses from V–5. The horizontal bar generator V–10 is operative during horizontal bars, crosshatch and dots generation only.

White dot signals are produced by adding the horizontal and vertical bar signals from V–10 and V–9, respectively, and then clipping to obtain a signal from the coincidence of the horizontal and vertical bar pulses. Switch S1CF is placed in the dots position connecting the combined outputs of V–9 and V–10 to dot clipper V–26B. During all other operations, switch S1CF is positioned as shown. It is noted that the dot positions correspond to the intersections in the crosshatch pattern.

The horizontal and vertical synchronizing signals from V–5 and V–8 are mixed and amplified by horizontal and vertical synchronizing amplifier V–11B as indicated in FIGURE 1*b*. The combined horizontal and vertical synchronizing signals can be provided to a synchronizing output connector as indicated.

The vertical bar or burst-gate signal from V–9, horizontal bar signal from V–10 or the dots signal from V–26B are applied to bar or burst-gate amplifier V–11A. Switch S1AR is placed in the position shown for monochrome functions (V bars, H bars, crosshatch and dots generation) such that the vertical bar and/or horizontal bar signals are mixed with the horizontal blanking signal from V–7 by blanking and video mixer V–12. The output of V–12 is combined with the output of V–11B and passed through video clipper V–27 which controls the video waveform by means of a series connected diode followed by a shunt connected diode.

The controlled output from V–27 is fed to modulated R.-F. amplifier V–13 and also to video output amplifier V–15. A positive or negative polarity video output can be obtained from V–15. A crystal-controlled video carrier oscillator V–14A has its output connected to feed R.-F. modulator V–13 to provide a modulated R.-F. output at terminal J5: The output of video carrier oscillator V–14A can also be connected to mix with a sound carrier generated in the crystal-controlled 4.5 mc. oscillator-mixer V–14B to produce an output signal which can be added at J5.

When color band signals are desired, the switch S1AR is placed in the lower position connecting (from V–22A) with the "Y" luminance signal mixers. At the same time V–9 is connected to function as a burst-gate generator and V–11A transmits its output to color burst gate V–23A. Chroma signals from chroma output amplifier V–28B are fed to V–13 and V–15 with the output from video clipper V–27. Thus, the luminance and chroma signal components are added to the synchronizing and blanking pulses to form a complete color video signal.

The chroma phases are selected by means of color adders which mix precisely-phased signals from a 3.579545 mc. reference oscillator V–16B as shown in FIG. 1*c*. The phases are selected from a tapped delay line DL–1 in the output circuit of the reference oscillator. Each color adder is turned "on" by a gating tube for a specific length of time. The color-burst adder (V–20B for the "A" and "B" bands and V–23B for the "C" band), also selects a phase from the delay line DL–1, and is turned "on" through switch S1ERA by color burst gate V–23A which amplifies the burst gate from V–9 triggered by the trailing edge of the horizontal synchronizing pulse. This color-burst adder selects a burst phase from the delay line DL–1 with the proper phase relationship to the chroma phases.

Horizontal blanking pulses from V–7B are coupled through a differentiating network and to a diode (CR–4) which passes the trailing edges to pulse amplifier V–28A. These trailing edges are also applied to pulse amplifiers V–20A and V–21A for color-bar band "A" through switch S1FRA which also connects the output of pulse amplifier V–28A to pulse amplifier V–21B for the "A" band. The outputs of V–28A, V–20A are respectively applied to bar gate generators V–17 and V–18. The outputs of V–21B and V–21A are both applied to bar gate generator V–19.

The outputs of green gate generator V–17, red gate generator V–18 and blue gate generator V–19 are respectively applied to bar gates V–22A, V–24A and V–25A. The luminance or "Y" component of the video signal is developed in the plate circuits of gating tubes V–22A, V–24A and V–25A. Matrixing of the "Y" signal according to standard NTSC proportions is accomplished by a resistive network in the common plate circuits of the gating tubes and is applied to the control grid of video mixer V–12A through switch S1AR (FIGURE 1*b*) only for the "A" band.

Outputs from the cathode circuits of the gating tubes are applied to control adders V–22B, V–24B and V–25B. Adder V–22B is not used during "B" and "C" color bands as indicated by the band letter notation by switch S1ER. Adder V–23B is connected to the output of V–22A for producing the "B" color band. Similarly, adder V–20A is not used during the "C" band and, instead, V–23B is used for the reference burst signals for the color band. The chroma phases and the color burst are mixed and amplified by chroma output amplifier V–28B and used to modulate the video carrier through modulator V–13.

A detailed wiring diagram of the invention is illustrated by combined FIGURES 2*a*, 2*b*, 2*c* and 2*d*. These figures, when placed successively adjacent in sequence, can be viewed as a single, complete drawing by aligning and matching broken leads between the adjacent figures. While specific types and values of components have been indicated in the drawings, these have been noted as examples only, and are not intended to restrict the breadth and scope of the present invention. A functional and sectional description of the invention depicted in FIGURES 2*a*, 2*b*, 2*c* and 2*d* follows.

FREQUENCY DIVISION

The crystal-controlled master timing oscillator V–1A generates a signal of 283.217 kc. This oscillator is coupled through capacitor C–4 to a blocking oscillator V–1B which includes transformer T–1. The output frequency of blocking oscillator V–1B, which can be adjusted by means of potentiometer R–6, is approximately 31.5 kc. This output is direct coupled from the cathode of V–1B to the grid of buffer-amplifier V–2A which then triggers blocking oscillator V–2B. A 31.5 kc. output is also taken from the plate resistor R–5 of V–1B and negative synchronizing spikes are coupled through C–16 to the grid of buffer-amplifier V–6A.

Blocking oscillator V–2B divides the 31.5 kc. signal by seven, giving a 4.5 kc. output. In a similar manner, blocking oscillators V–3B and V–4B divide the signal frequency by five and three respectively, giving a frequency of 300 c.p.s. at the cathode of V–4B.

SYNC AND BLANKING PULSE GENERATION

The 300 c.p.s. signal from V–4B is coupled through capacitors C–13 and C–14 to the grid of V–5B. The 60 c.p.s. vertical synchronizing signal is derived from this 300 c.p.s. signal by means of V–5A and V–5B which form a cathode-coupled asymmetrical multivibrator. Positive output pulses from V–4B are used to synchronize the vertical synchronizing generator V–5.

The natural frequency of the multivibrator, V–5, is adjusted by means of potentiometer R–36 in the grid-return circuit of V–5B. This frequency must be slightly less than one fifth the frequency from V–4B for proper synchronization. The width of the vertical synchronizing pulses is adjusted by means of potentiometer R–32 in the common cathode circuit.

The 60 c.p.s. vertical synchronizing (blanking) pulses generated by V–5 are negative pulses coupled from the plate of V–5B to the grid of V–11B and positive pulses from the common cathode circuit of V–5 to the grid of V–10B.

Buffer-amplifier V–6A amplifies the 31.5 kc. signal from V–1B and delivers 31.5 kc. pulses to horizontal-blanking generator V–7 through diode CR–1. Blanking generator V–7 is a multivibrator, similar in circuit to V–5, which produces output blanking pulses of 15,734 c.p.s. each with a duration of approximately 10$\mu$-sec. Potentiometers R–45 and R–46 are used to adjust the pulse width and frequency respectiveily.

Negative blanking pulses are taken from the plate of V–7B and coupled through capacitor C–28 to the grid of mixer V–12B which is clamped to ground by V–26A.

Also, negative blanking pulses from the screen grid of V–7B are coupled through capacitor C–18 to the screen grid of V–8A and through differentiating-capacitor C–49 to diode CR–4. The trailing edges are passed from CR–4 to the control grids of V–28A, V–20A, and V–21A.

Monostable-multivibrator V–8, which is triggered by the output of V–7B, generates the horizontal synchronizing signal. The width of the horizontal synchronizing pulses is approximately 5μ-sec. and is adjustable by means of potentiometer R–49 which controls the positive potential applied to the control grid of V–8A. A positive horizontal synchronizing pulse is applied to the cathode of diode-connected V–6B through capacitor C–21. Horizontal synchronizing signal (negative) is also taken from the plate of V–8A and coupled through capacitor C–34 to the control grid of horizontal and vertical synchronizing amplifier V–11B.

The combined horizontal and vertical synchronizing signal is taken from the cathode of V–11B and applied through switch section S3AR to the Sync output connector. Combined synchronizing pulses are also taken from the plate of V–11B and coupled to the video output amplifier, V–15, and to modulated R.-F. amplifier V–13. The remainder of the video components are also present at this point in the circuit. The waveform is controlled by series clipper V–27A and shunt clipper V–27B.

BAR AND CROSSHATCH GENERATION

The positive horizontal synchronizing signal from V–8B is differentiated by capacitor C–21 and resistor R–56, and the negative trailing edge passed by diode V–6B is used to time the operation of vertical bar generator V–9. Since the bar frequency is higher than the horizontal sweep frequency, it follows that the bar generator V–9 must be free-running during the horizontal sweep. However, to ensure that the bar pattern will remain stationary on the kinescope of an associated television receiver it is essential for the bar pulses to keep the same timing relationship with the beginning of each sweep interval. For this reason, the horizontal synchronizing pulse is used to synchronize the vertical bar generator at the beginning of each sweep interval. A negative output pulse appears at the plate of V–9B with each negative spike from diode V–6B.

The vertical bar generator, V–9, is used as a burst-gate generator during color-bar generation. Switch-section S1BF selects cathode-potentiometer R–58 or R–61 to control the bar or brust-gate width respectively. Grid-return potentiometer R–65 is used to adjust the number of vertical bars generated per horizontal sweep interval. Switch-section S1BR disconnects R–65 when necessary.

Horizontal bar generator V–10 operates in a similar manner to V–9, being synchronized at the beginning of each vertical sweep interval by the trailing edge of the vertical synchronizing pulses from V–5. Potentiometers R–67 and R–70 control the number of horizontal bars and the width of each bar respectively. The positive cathode pulses from V–5 are differentiated and applied to V–10B. Diode CR–2 shunts off the positive leading edges of the vertical synchronizing pulses to provide trigger pulses of the proper polarity to the control grid of V–10B. Each negative spike initiates a negative output pulse from the plate of V–10A.

The vertical bar generator V–9 is operative during the V Bars, Crosshatch, and Dots functions, as well as during the three color functions. The horizontal bar generator V–10 is operative during the H Bars, Crosshatch, and Dots functions only. The output of the horizontal and/or vertical bar generators is coupled from the common plate circuit of V–9B and V–10A through switch S1CF to the grid of V–11A through capacitor C–26.

The output of V–11A is taken from the plate and applied through switch-section S1AR and capacitor C–44 to the control grid of video-mixer V–12A (first four functions only).

Switch-section S1CR connects resistor R–184 to the grid of V–11A, forming a voltage divider with R–73 to place a positive bias on V–11A for the Dots and color functions. Switch-section S1AF grounds the cathode of V–11A through resistor R–179 and capacitor C–45 during functions one through four, but not for the color functions.

DOT GENERATION

When the function switch is placed in the Dots position, the combined output of the horizontal and vertical bar generators V–10 and V–9 is applied to the grid of V–11A through clipper V–26B. This causes V–12 to conduct only during coincidences of horizontal and vertical bar pulses, resulting in white dots appearing on the kinescope of an associated television receiver. The position of these dots corresponds to the intersections in the Crosshatch pattern.

VIDEO OUTPUT

The video signal from the plate of V–27A is coupled through capacitor C–80 to the control grid of phase-splitter V–15. Switch S–2 determines the polarity of the video output by selecting either the plate or cathode circuit of V–15 as the signal source. Peaking coil L–9 preserves the high frequency components of the video signal. The amplitude of the signal at the Video Output connectors is adjusted by means of potentiometer R–189.

R.-F. GENERATION AND MIXING

The R.-F. video carrier frequency is generated by crystal-controlled oscillator V–14A. This oscillator, which is of the tuned-plate tuned-grid type, supplies a carrier preferably on television channel three or channel four, depending on the crystal used. The output of the oscillator is coupled from the plate of V–14A through capacitor C–36 to the control grid of V–13. The R.-F. amplitude is adjusted by means of variable bypass-capacitor C–35 in the grid circuit of modulated R.-F. amplifier V–13.

The video information is impressed on the R.-F. carrier by suppressor-grid modulation of V–13. When a negative signal is impressed on the supressor grid, the carrier is reduced at the output, corresponding to white. The modulated R.-F. output is taken from the secondary of transformer T–5 and applied to the R.-F. Output connector through a resistive network.

The R.-F. signal from the plate of V–14A is also coupled through capacitor C–39 to the control grid of sound-carrier oscillator V–14B. This oscillator, which can be turned On or Off by means of the Sound switch S4, is crystal controlled at 4.5 mc. The 4.5 mc. output mixes with the video-carrier signal from V–14A and produces an addition frequency of ($F+4.5$ mc.) which is coupled from the tuned plate circuit of V–14B to the resistive R.-F. output network. This method of frequency addition ensures that the sound carrier will always be exactly 4.5 mc. above the video carrier.

EXTERNAL SYNC OPERATION

When power-sync switch S3AR is in an Internal synchronizing position, the device operates on the internal synchronizing signal source composed of tubes V–1 through V–4. Switching S3AR to an External synchronizing position removes the plate voltage from these tubes and connects the Sync connector J1 as an input for an external synchronizing signal source.

The external synchronizing signal is generally integrated by capacitor C–48 and resistor R–167, and differentiated by capacitor C–78 and resistor R–78 to separate the vertical and horizontal synchronizing signals. The integrated vertical synchronizing signal is applied to the grid of V–5A and the differentiated horizontal synchronizing signal is applied to the grid of V–7A.

COLOR-BAR BAND "A" SIGNAL GENERATION

*General.*—The signal output for color-bar band "A" is produced by modulating the video carrier with a sequence of 3.58 mc. signals of various relative phases and time intervals. NTSC green, red, and blue chroma phases are selected by separate color adders from taps on a precision delay line in the output circuit of the 3.579545 mc. reference oscillator.

Each color adder is turned "on" by a gate tube for a specific time which corresponds to the "on" time for the color. By making the "on" times overlap, three complementary colors are produced in addition to the three primaries and black and white.

A color-burst adder is turned "on" by a burst gate which is triggered by the trailing edge of the horizontal synchronizing pulse. This adder selects a burst phase from the delay line with the proper phase relationship to the chroma phases.

Figure 3:
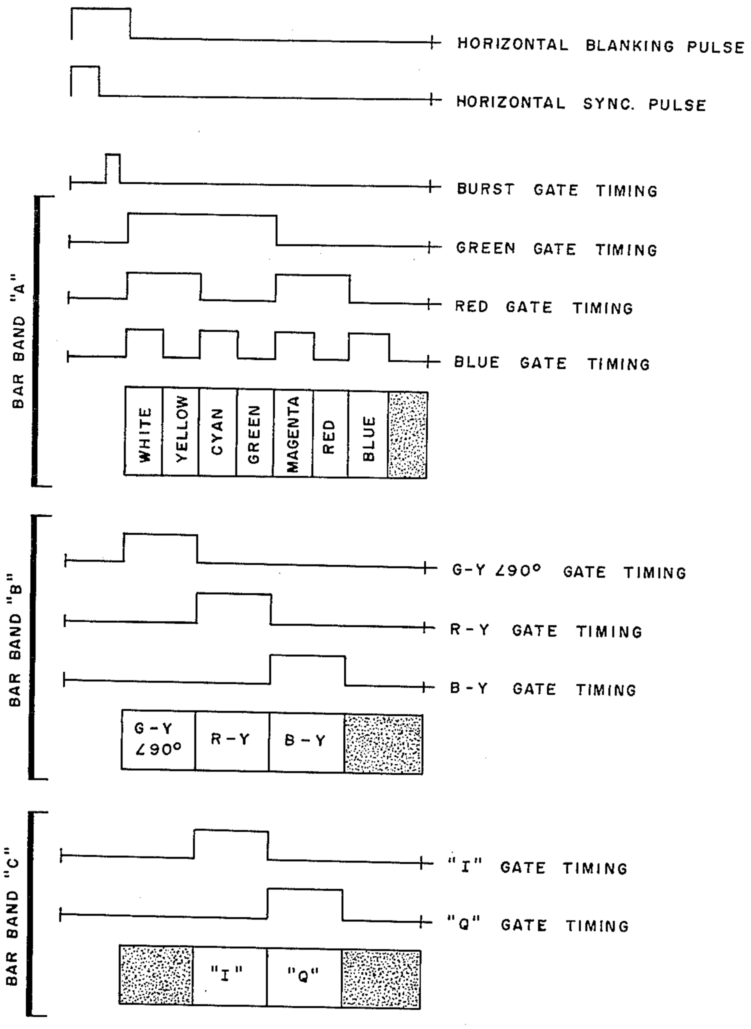
FIGURE 3 is a chart of pulse timing diagrams illustrating production of color bar bands "A," "B" and "C"

*Cycle of operation.*—The trailing edges of the horizontal synchronizing pulse, as schematically shown in FIGURE 3, triggers the burst-gate generator which then permits the burst adder to pass approximately eight cycles of the 3.58 mc. burst signal. The waveforms illustrated in FIGURE 3 are actually inverted, when considering polarities relative to the circuit shown in FIGURES 2*a*, 2*b*, 2*c* and 2*d*.

The horizontal blanking pulse is differentiated and the trailing edge is simultaneously applied to three pulse amplifier tubes which, in turn, trigger three monostable gate generators. The gate generators permit the green, red, and blue gating tubes to pass their 3.58 mc. signals for approximately 26, 13, and 6.5$\mu$-sec. respectively.

The trailing edge of the green gate pulse is used to trigger the red and blue gate generators again, and each trailing edge of the red gate pulses is used to trigger the blue gate generator. Thus, over one horizontal line interval the green gate generator is triggered once, the red gate generator is triggered twice, and the blue gate generator is triggered four times. This is illustrated in FIGURE 3 within the bracket labeled bar band "A."

Figure 4:
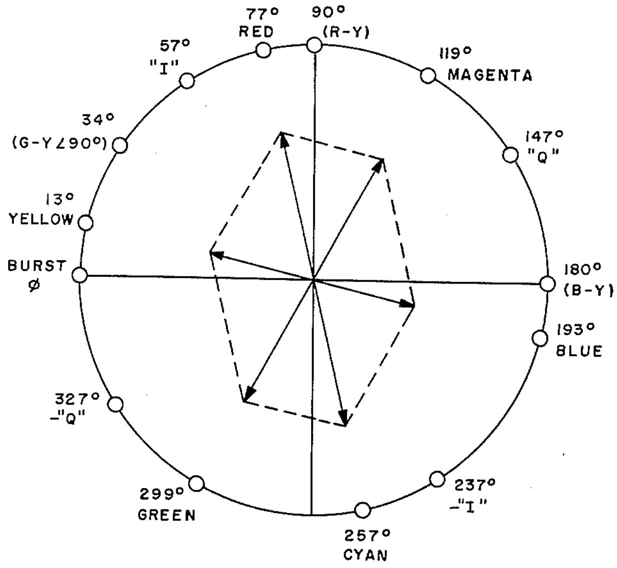
FIGURE 4 is a vector diagram showing vector addition of primary colors producing complementary colors on a color circle.

Since the green, red, and blue chroma signals overlap during parts of the horizontal trace interval, the chroma output voltage is a resultant of the combined phase and amplitude of the three signals during the times of overlapping. This vector addition, illustrated in the color circle diagram of FIGURE 4, causes six colors to appear in band "A" as well as black and white. White is caused by the vector sum of green, red, and blue. Yellow is the vector sum of green and red. Magenta is the vector sum of red and blue. Cyan is the vector sum of green and blue. Black is the absence of any chroma or luminance voltage.

*Circuit description.*—The 3.579545 mc. reference signal is generated by crystal-controlled oscillator V–16B and coupled from the tuned plate circuit through capacitor C–71 to one end of precision delay line DL–1. The precision delay line has five taps spaced to give the desired relative signal phases. The phase intervals between the taps are 61°, 33°, 57°, and 90°. In addition to these phase intervals, phase-shifting networks are provided for the last two taps which add 13° and subtract 13° respectively to give a phase interval of 116° between these taps during the band "A" function.

Figure 5:
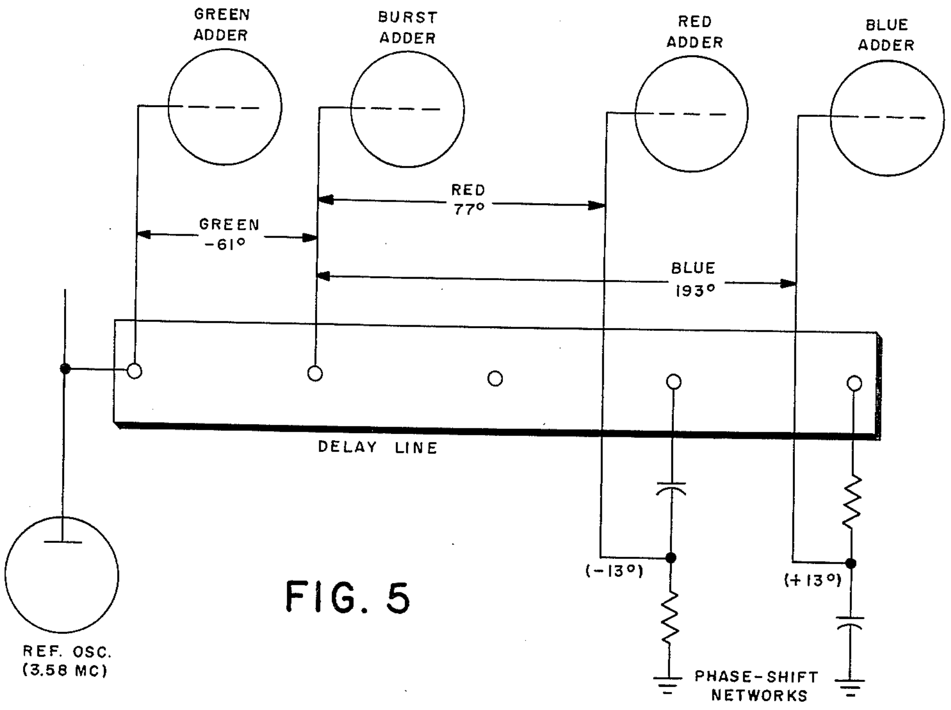
FIGURE 5 is a simplified schematic illustrating band "A" phase selections.

When the function switch is set to position "A," the cathodes of adders V–22B, V–20B, V–24B, and V–25B are connected to the cathode circuits of gating tubes V–22A, V–23A, V–24A, and V–25A respectively. The grids of the adders V–22B, V–20B, V–24B, and V–25B are connected to delay-line taps one, two, four, and five respectively. This produces the proper signals having correct phases to provide green, red and blue signals as shown in FIGURE 5. Adder V–23B, which has its grid connected to the third delay-line tap, is not used in the generation of band "A".

Switch-sections S1EF, S1FF, and S1FR connect the proper positive grid potentials to the three monostable gate generators V–17, V–18 and V–19, and switch-section S1FRA connects the cathodes of V–20A, V–21A, and V–21B to the positive potential at the junction of resistors R–10 and R–11. This permits the three blanking-pulse trailing-edge amplifiers V–28A, V–20A and V–21A to trigger the three gate generators V–17, V–18 and V–19, and allows V–21B to trigger blue gate-generator V–19 with the differentiated trailing edge of the green gate pulse to form the series of waves shown in FIGURE 3 for the "A" band.

The horizontal blanking pulse is differentiated by capacitor C–49 and resistor R–103, and rectified by diode CR–4 in the common grid circuit of V–28A, V–20A, and V–21A. This ensures that the gate generators will not be triggered by the negative leading edge of the blanking pulse. Diodes CR–5 and CR–6, in the screen circuits of V–18A and V–19A perform similar functions, prventing the red and blue gate generators from being triggered by the leading edges of their differentiated trigger pulses but not the trailing edges.

The positive trailing edge of the negative horizontal blanking pulse causes pulse amplifiers V–28A, V–20A and V–21A to conduct momentarily so that their negative plate outputs respectively trigger green gate generator V–17, red gate generator V–18 and blue gate generator V–19. This produces three negative gate pulses. The positive trailing edge of the negative green gate from the plate of V–17A has its negative trailing edge complement appearing at the plate of V–17B, which signal is passed by CR–5 to trigger red gate generator V–18 at that time. At the same time, the screen grid of V–17A which is acting like a second plate, provides a positive spike to the control grid of V–21B which, in turn, applies its resulting negative plate drop to trigger blue gate generator V–19.

The gate pulses generated by the monostable generators V–17, V–18 and V–19 are applied to the control grids of the appropriate gating tubes, V–22A, V–24A and V–25A. The gating tubes cut off during the gate intervals, causing the positive potential on the cathodes of the associated chroma adders V–22B, V–24B and V–25B to drop. This permits the chroma and burst adders to pass their 3.58 mc. signals during the gate pulses. The burst adder V–20B is, of course, controlled by the output of burst gate generator V–9.

The gain of the chroma and burst adders is controlled by the setting of potentiometers R–123, R–133, R–137, and R–143 in their respective cathode circuits. The relative gain of each chroma adder determines the relative amplitude of each chroma component in the composite chroma output. The chroma output is taken from the common plate circuit of the chroma adders and applied through capacitor C–92 to the chroma output amplifier, V–28B, and then through capacitors C–43 and C–33 to the suppressor grid of V–13.

Figure 6:
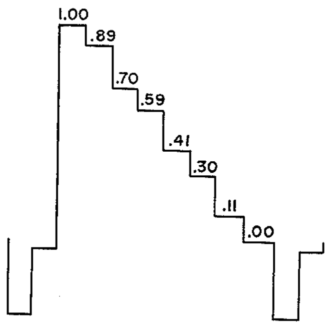
FIGURE 6 is a waveform diagram of the monochrome component for band "A" including synchronizing and blanking signals.
Figure 7:
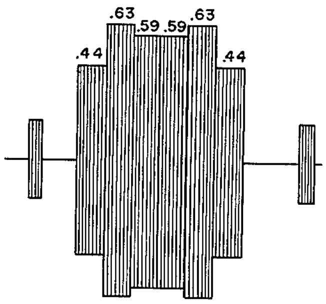
FIGURE 7 is a waveform diagram of the chroma component for band "A" including the reference burst signal.
Figure 8:
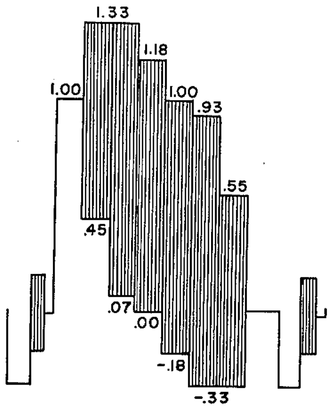
FIGURE 8 is a waveform diagram of the complete band "A" signal.

The luminance or "Y" component of the video signal is developed in the plate circuits of gating tubes V–22A, V–24A and V–25A. Matrixing of the "Y" signal according to the standard proportions $$(0.59G+0.30R+0.11B=Y)$$

is accomplished by the resistive network in the common plate circuits of the gating tubes, and the overall amplitude of the "Y" signal is determined by the setting of potentiometer R–129. The "Y" component is applied as a positive signal to the control grid of video mixer V–12A, through switch-section S1AR. FIGURE 6 illustrates the "Y" signal, including synchronizing and blanking signals. The bias on V–12A is determined by potentiometer R–128 during the band "A" function. The chroma component including color and burst signals as shown in FIGURE 7 is the output from V–28B and this is added to the monochrome component at V–13 (and V–15) to produce the complete band "A" signal shown in FIGURE 8.

COLOR-BAR BAND "B" GENERATION

*General.*—The output signal for color-bar band "B" is produced in a similar manner to band "A." The gate timing and chroma phasing, however, are quite different.

The first gate generator V–17, used to generate the green gate for band "A," is connected to generate a gate for a chroma phase which is in quadrature with the G—Y phase. The second gate generator V–18, used to generate the red gate for band "A," is connected to generate a gate for an R—Y chroma phase. The third gate generator V–19, used to generate the blue gate for band "A," is connected is to generate a gate for a B—Y chroma phase. As with band "A," the trailing edge of the first gate pulse triggers the second gate generator and the trailing edge of the second gate pulse triggers the third gate generator.

*Cycle of operation.*—The color burst is produced by the same method as for band "A." The first gate generator V–17, triggered by the trailing edge of the horizontal blanking pulse, generates a 13$\mu$-sec. pulse which gates the G—Y<90° chroma phase "on" and then triggers the second gate generator V–18. The second gate generator V–18 produces a 13$\mu$-sec. pulse which gates the R—Y chroma phase "on" and then triggers the third gate generator V–19. The third gate generator V–19 gates the B—Y phase "on" for 13$\mu$-sec. The remainder of the horizontal trace is black, since no chroma phase is present.

*Circuit description.*—Adder V–22B, which is not used in the generation of band "B," is disconnected by switch-section S1ER. Adder V–23B, which selects the

Figure 9:
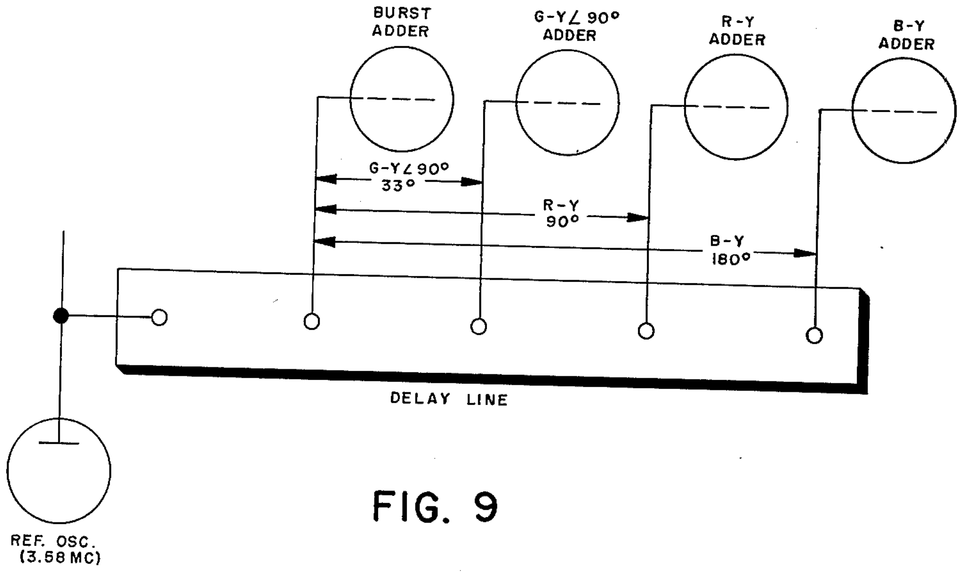
FIGURE 9 is a simplified schematic of band "B" phase selections.

G—Y<90° chroma phase (see FIGURE 9), is connected to gating-tube V–22A through switch-section S1ERA. The 13° phase-shifting networks for the last two delay-line taps are bypassed by switch-sections S1EFA and S1FFA, giving a 90° interval between the R—Y and B—Y chroma phases. Adders V–24B and V–25B select the R—Y and B—Y phases respectively.

The "Y" output is disconnected from the video mixer V–12 by switch-section S1AR. Switch-section S1FRA disconnects the cathodes of V–20A, V–21A, and V–21B so that the gate generators V–17, V–18 and V–19 can be triggered only in sequence and not simultaneously. Switch-sections S1EF, S1FF, and S1FR select the proper gate-timing potentiometers R146, R148 and R150, and switch-section S1DF bypasses the cathode of V–25B through capacitor C–79.

With the foregoing exceptions, the color circuits are the same for band "B" as for band "A".

COLOR-BAR BAND "C" GENERATION

*General.*—The first gate generator V–17 produces a pulse immediately after the horizontal blanking pulse in the same manner as for bands "A" and "B." The associated gate tube V–22B is not connected to a chroma adder, however, therefore no chroma signal output is produced during this pulse. The trailing edge of the first gate pulse triggers the second gate generator V–18 which produces a gate for an "I" chroma phase. The trailing edge of the second gate pulse triggers the third gate generator V–19 which produces a gate for a "Q" chroma phase.

*Cycle of operation.*—The color burst is produced following the horizontal synchronizing pulse as usual. A 13$\mu$-sec. black bar is produced during the first gate pulse, and 13$\mu$-sec. "I" and "Q" bars are produced during the second and third gate pulses respectively. A 13$\mu$-sec. black bar follows the "Q" bar.

*Circuit description.*—Adders V–22B and V–20B are not used in the generation of band "C." Adder V–23B, which is used as the color-burst adder, is connected to gating-tube V–23A through switch-section S1ERA. As with band "B," the 13° phase-shift networks are bypassed to give a 90° phase difference between the last two delay-line taps.

Figure 10:
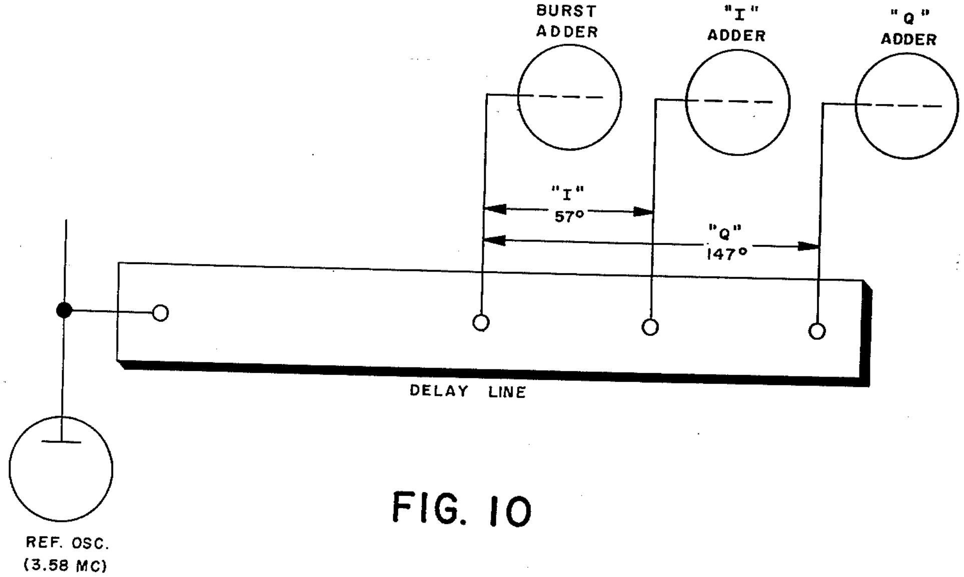
FIGURE 10 is a simplified schematic of band "C" phase selections.

By using the third tap on the delay line for the burst phase instead of the second, the burst is advanced 33° in phase relative to the last two taps, as shown in FIGURE 10. This produces "I" and "Q" chroma phases in place of R—Y and B—Y phases.

With the foregoing exceptions, the generation of band "C" is similar to band "B."

POWER SUPPLY

Power-sync switch S3AF controls the primary A.-C. power to transformer T–6 which supplies power to the entire device. Filament power for all tubes and indicator lamp I–1 is taken from the 6.3-volt winding. The +200-volt plate supply is furnished by rectified voltage from the center-tapped high-voltage secondary winding. Metallic rectifiers and pi-section L—C filtering are employed.

Regulation of the +200-volt output is not necessary, since the critical circuits are relatively insensitive to variations in plate voltage.

Switch S3AR removes all plate voltage in a Standby position and applies plate voltage to the synchronizing section in the Internal position only. The function switch S1DR applies plate voltage to the color section during the color functions only.

It is to be understood that the particular embodiment of the invention described above and shown in the drawings is merely illustrative of and not restrictive on the broad invention, and that various changes in design, structure and arrangement may be made without departing from the spirit and scope of the broader of the appended claims.

What is claimed is:

1. A signal generator for supplying precise test signals for alignment and troubleshooting of color television equipment, comprising: means for providing accurate horizontal and vertical timing signals; generators responsive respectively to the horizontal and vertical timing signals for providing horizontal and vertical synchronizing pulses, the vertical synchronizing pulses serving simultaneously as vertical blanking pulses; generators responsive to the horizontal timing signals for providing horizontal blanking pulses and a burst gate; a reference oscillator; delay means connected to said reference oscillator for providing a plurality of different signals of different phases, the different signals including chroma signals and a burst signal; encoding means including a plurality of adders each having one of the chroma and burst signals individually applied thereto, a plurality of gate generators responsive to the trailing edge of each horizontal blanking pulse for providing a series of control gates, output means connected to said adders for combining output signals therefrom, and means for selectively applying the burst and control gates to said adders to energize selected adders and produce an encoded color signal having a predetermined sequence of burst and chroma signals at predetermined phase intervals between signals, in said output means, said selective means including means for varying initial output time and duration of each of the control gates from said gate generators according to the sequence selected for the encoded color signal; and mixing circuit connecting with said synchronizing and blanking generators and said encoding means for providing a composite video signal from the generated synchronizing and blanking pulses and the encoded color signal.

2. Apparatus in accordance with claim 1 wherein said mixing means includes a blanking and video signal mixer, a horizontal and vertical synchronizing signal mixer, and a video clipper connected to receive outputs from both said mixers for waveform control, said clipper having an output which is combined with the encoded color signal to produce the composite video signal.

3. Apparatus in accordance with claim 1 wherein said gate generators include first, second and third monostable multivibrators connected for serial triggering of a succeeding multivibrator by the preceding one, said time and duration varying means includes means responsively energizable by the trailing edge of each horizontal blanking pulse for simultaneously triggering said monostable multivibrators and means responsive to the trailing edge of the control gate of said first monostable multivibrator for triggering said third monostable multivibrator, and including, in addition, matrix means responsive to the control gates for providing a luminance output signal, said mixing means including means for mixing the luminance signal with the outputs of said synchronizing and blanking generators, whereby a luminance component signal is provided for the composite video signal.

4. Apparatus in accordance with claim 1 wherein said delay means includes a delay line having five output taps providing phase intervals between signals of adjacent taps of 61°, 33°, 57° and 90°, and phase shifting means connectable to the last two taps for adding 13° and subtracting 13° respectively, whereby a phase interval of 116° can be additionally provided between the last two taps.

5. In a signal generator of the class described, in combination: a reference oscillator; a delay line connected to said reference oscillator and having a series of output taps providing a different signal of different phase at each tap, the different signals including chroma signals and a burst signal; a plurality of chroma and burst adders for receiving the respective chroma and burst signals; output means connected to said adders for combining output signals therefrom; a burst gate generator; a plurality of gate generators for providing a series of control gates; and means for selectively applying the burst and control gates to said adders to energize selected adders and produce an encoded color signal having a predetermined sequence of burst and chroma signals at predetermined phase intervals between the signals, in said output means, said selective means including means for varying initial output time and duration of each of the control gates from said gate generators according to the sequence selected for the encoded color signal.

6. Apparatus in accordance with claim 5 wherein said gate generators include first, second and third monostable multivibrators connected for serial triggering of a succeeding multivibrator by the preceding one.

7. Apparatus in accordance with claim 5 wherein said time and duration varying means includes means responsively energizable by the trailing edge of each horizontal blanking pulse generated in the signal generator for simultaneously triggering said monostable multivibrators and means responsive to the trailing edge of the control gate of said first monostable multivibrator for triggering said third monostable multivibrator, and including, in addition, matrix means responsive to the control gates for providing a luminance component signal for the encoded color signal.

8. Apparatus in accordance with claim 5 wherein said delay line includes five output taps providing different signals having phase intervals between adjacent taps of 61°, 33°, 57° and 90°, and phase shifting means connectable to the last two taps for adding 13° and subtracting 13° respectively, whereby a phase interval of 116° can be additionally provided between the last two taps.

9. Apparatus in accordance with claim 8 wherein said phase shifting means includes two series connected resistance-capacitance phase shifting networks respectively connectable to the last two taps.

10. In a signal generator of the class described, in combination: a reference oscillator; a delay line connected to said reference oscillator and having at least five output taps for providing a different signal of different phase at each tap; at least five adders each adapted to receive one of the different signals from the output taps; output means connected to said five adders for combining output signals therefrom; a burst gate generator responsively energized to produce a burst gate by the trailing edge of each horizontal synchronizing pulse generated in the signal generator; gate generators including at least three monostable multivibrators connected for serial triggering of a succeeding multivibrator by the preceding one, said gate generators being energized in serially triggered operation responsively by the trailing edge of each horizontal blanking pulse generated in the signal generator and producing a sequential series of control gates; a gated burst amplifier responsively energized by each burst gate and producing a burst control signal; at least three gated chroma amplifiers connected respectively with said three monostable multivibrators, each of said three gated amplifiers being respectively energized by the control gate from a corresponding monostable multivibrator and producing a chroma control signal; and switching means for selectively applying the control signals from said gated burst and chroma amplifiers to said adders to energize selected adders and produce an encoded color signal having a predetermined sequence of burst and chroma signals at predetermined phase intervals between signals, in said output means.

11. Apparatus according to claim 10 wherein said delay line provides signal phase intervals between taps of 61°, 33°, 57° and 90°, and including, in addition, phase shifting means connectable to the last two taps for adding 13° and subtracting 13° respectively, whereby a phase interval of 116° can be additionally provided between the last two taps.

12. Apparatus in accordance with claim 11 including, in addition, means for varying initial output time and duration of each of the control gates from said gate generators, said time and duration varying means being selectively varied according to operation of said switching means in selecting the sequence of the encoded color signal, and including means responsively energizable by the trailing edge of each horizontal blanking pulse generated in the signal generator, for simultaneously triggering said three monostable multivibrators and means responsive to the trailing edge of the control gate of the first monostable multivibrator for triggering the third sucessive monostable multivibrator; and matrix means connected to said gated chroma amplifiers and responsive to the control gates from said three monostable multivibrators for producing a luminance component signal.

13. A signal generator for supplying precise test signals for alignment and troubleshooting of color television equipment, comprising: means for providing accurate horizontal and vertical timing signals; generators responsive respectively to the horizontal and vertical timing signals for providing horizontal and vertical synchronizing pulses, the vertical synchronizing pulses serving simultaneously as vertical blanking pulses; a generator responsive to the horizontal timing signal for providing horizontal blanking pulses; a reference oscillator; a delay line connected to said reference oscillator and having at least five output taps for providing different signals having phase intervals between signals of adjacent taps of 61°, 33°, 57° and 90°, and phase shifting means connectable to the last two taps for adding 13° and subtracting 13° respectively, whereby a phase interval of 116° can be additionally provided between the last two taps, the different signals comprising chroma signals and a burst signal; at least five adders each adapted to receive one of the chroma and burst signals respectively from the output taps; output means connected to said five adders for combining output signals therefrom; at least three gate generators including first, second and third monostable multivibrators connected for serial triggering of a succeeding multivibrator by the preceding one and responsive to the trailing edge of each horizontal blanking pulse to provide a sequential series of control gates; a burst gate generator responsively energized by the trailing edge of each horizontal synchronizing pulse to produce a burst gate; a gated burst amplifier responsively energized by each burst gate and producing a burst control signal; at least three gated chroma amplifiers connected respectively to said three monostable multivibrators, each of said three gated chroma amplifiers being respectively energized by the control gate from a corresponding multivibrator and producing a chroma control signal; means for selectively applying the control signals from said gated burst and chroma amplifiers to said adders to energize selected adders and produce an encoded color signal having a predetermined sequence of burst and chroma signals at predetermined phase intervals between signals, in said output means; means for varying initial output time and duration of each of the control gates from said monostable multivibrators, said time and duration varying means being selectively varied according to operation of said selective means in selecting the sequence of the encoded color signal, and including means responsively energizable by the trailing edge of each horizontal blanking pulse for simultaneously triggering all of said monostable multivibrators, and means responsively energized by the trailing edge of the control gate of said first monostable multivibrator for triggering said third monostable multivibrator; matrix means connected to said gated chroma amplifiers and responsive to the control gates from said monostable multivibrators for producing a luminance component signal; and mixing means connecting with said synchronizing and blanking generators and said encoding means for providing a composite video signal from the generated synchronizing and blanking pulses and the encoded color signal.

14. Apparatus in accordance with claim 13 wherein said adders are electron tubes each including an anode, cathode and control grid, the anodes being connected to said output means, the cathodes being selectively connectable by said selective means to said gated burst and chroma amplifiers, and the control grids being adapted to be connected to respective taps of said delay line.

15. Apparatus in accordance with claim 13 wherein said mixing means includes a blanking and video signal mixer, a horizontal and vertical synchronizing signal mixer, and a video clipper connected to receive outputs from both said mixers for waveform control, said clipper having an output which is combined with the encoded color signal to produce the composite video signal.

References Cited in the file of this patent

UNITED STATES PATENTS

| | | |
|---|---|---|
| 2,296,393 | Martinelli | Sept. 22, 1942 |
| 2,410,233 | Percival | Oct. 29, 1946 |
| 2,499,039 | Simmon | Feb. 28, 1950 |
| 2,595,646 | Doba | May 6, 1952 |
| 2,683,187 | Rynn | July 6, 1954 |
| 2,693,530 | MacDonald | Nov. 2, 1954 |
| 2,733,433 | Morrison | Jan. 31, 1956 |
| 2,742,525 | Larky et al. | Apr. 17, 1956 |
| 2,751,429 | Schlesinger | June 19, 1956 |
| 2,836,717 | Sullivan | May 27, 1958 |
| 2,844,646 | Wlasuk | July 22, 1958 |
| 2,858,368 | Kennedy | Oct. 28, 1958 |
| 2,876,347 | Wentworth | Mar. 3, 1959 |
| 2,877,291 | Bernard et al. | Mar. 10, 1959 |
| 2,924,647 | Bernard et al. | Feb. 9, 1960 |

OTHER REFERENCES

Broadcast News, published by RCA Jan.-Feb. 1954, Fig. 26 on page 18.